(12) United States Patent
Pulivendula et al.

(10) Patent No.: US 10,474,224 B2
(45) Date of Patent: Nov. 12, 2019

(54) QUICK ENERGY EFFICIENT REBOOT FROM ULTRA-LOW POWER MODE FOR A SYSTEM ON A CHIP

(71) Applicant: QUALCOMM Incorporated, San Diego, CA (US)

(72) Inventors: Deva Sudhir Kumar Pulivendula, Hyderabad (IN); Venkata Devarasetty, Hyderabad (IN); Nikesh Gupta, Hyderabad (IN); Srikanth Gudipudi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 15/458,843

(22) Filed: Mar. 14, 2017

(65) Prior Publication Data
US 2018/0267598 A1 Sep. 20, 2018

(51) Int. Cl.
*G06F 1/32* (2019.01)
*G06F 1/3296* (2019.01)
*G06F 9/4401* (2018.01)
*G06F 21/44* (2013.01)
*G06F 21/57* (2013.01)
*G11C 11/406* (2006.01)
*G11C 11/4074* (2006.01)

(52) U.S. Cl.
CPC .......... *G06F 1/3296* (2013.01); *G06F 9/4406* (2013.01); *G06F 21/44* (2013.01); *G06F 21/575* (2013.01); *G11C 11/4074* (2013.01); *G11C 11/40615* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| | | | |
|---|---|---|---|
| 7,039,819 B1 | 5/2006 | Kommrusch et al. | |
| 7,624,260 B2 * | 11/2009 | Ethier | G06F 9/4403 713/1 |
| 9,268,941 B1 | 2/2016 | Akdemir et al. | |
| 2009/0204835 A1 | 8/2009 | Smith et al. | |
| 2009/0292934 A1 | 11/2009 | Esliger | |

(Continued)

OTHER PUBLICATIONS

International Search Report and Written Opinion—PCT/US2018/019710—ISA/EPO—dated Jun. 4, 2018.

*Primary Examiner* — Zahid Choudhury
(74) *Attorney, Agent, or Firm* — Loza & Loza, LLP/Qualcomm (57) ABSTRACT

A method for reducing power in a system is provided according to aspects of the present disclosure. The system includes a chip, and a volatile memory. The method includes entering a sleep state, and exiting the sleep state. Entering the sleep state includes placing the volatile memory in a self-refresh mode, wherein the volatile memory stores one or more binary images and the volatile memory is powered in the sleep state, and collapsing multiple power supply rails on the chip. Exiting the sleep state includes restoring power to the multiple power supply rails on the chip, taking the volatile memory out of the self-refresh mode, and running the one or more binary images on one or more sub-systems on the chip.

20 Claims, 9 Drawing Sheets

(56) References Cited

U.S. PATENT DOCUMENTS

| | | |
|---|---|---|
| 2010/0005281 A1* | 1/2010 | Buchmann .......... G06F 13/4243 |
| | | 713/2 |
| 2010/0005285 A1* | 1/2010 | Yun ..................... G06F 1/1616 |
| | | 713/2 |
| 2013/0027413 A1 | 1/2013 | Jayavant et al. |
| 2013/0031388 A1 | 1/2013 | Sakarda |
| 2015/0346001 A1 | 12/2015 | Tripathi et al. |
| 2015/0362987 A1 | 12/2015 | Shin et al. |
| 2016/0224099 A1 | 8/2016 | Shen et al. |

* cited by examiner

QUICK ENERGY EFFICIENT REBOOT FROM ULTRA-LOW POWER MODE FOR A SYSTEM ON A CHIP

BACKGROUND

Field

Aspects of the present disclosure relate to power management, and more particularly, to reducing power in a sleep state.

Background

It is desirable to conserve power in a mobile device in order to extend the battery life of the mobile device. In this regard, a system on a chip (SoC) in the mobile device may employ various power-saving techniques to conserve power. One technique is to place the SoC in a sleep state (low-power state) when certain features of the SoC are not in use (e.g., certain applications are not active).

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A first aspect relates to a method for reducing power in a system. The system includes a chip, and a volatile memory. The method includes entering a sleep state, and exiting the sleep state. Entering the sleep state includes placing the volatile memory in a self-refresh mode, wherein the volatile memory stores one or more binary images and the volatile memory is powered in the sleep state, and collapsing multiple power supply rails on the chip. Exiting the sleep state includes restoring power to the multiple power supply rails on the chip, taking the volatile memory out of the self-refresh mode, and running the one or more binary images on one or more sub-systems on the chip.

A second aspect relates to a system. The system includes a volatile memory, a power controller, a sleep state controller, and a boot loader. The power controller is configured to control power to multiple power rails, and the sleep state controller is configured to place the system in a sleep state by placing the volatile memory in a self-refresh mode, wherein the volatile memory stores one or more binary images, and outputting a sleep-state enter signal to the power controller. The power controller is further configured to collapse the multiple power supply rails in response to the sleep-state enter signal, to power the volatile memory in the sleep state, and to restore power to the multiple power supply rails in response to a wakeup event. The boot loader is configured to take the volatile memory out of the self-refresh mode when the power to the multiple power supply rails is restored, and to cause one or more sub-systems to run the one or more binary images on the volatile memory.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

It is desirable to conserve power in a mobile device in order to extend the battery life of the mobile device. In this regard, a system on a chip (SoC) in the mobile device may employ various power-saving techniques to conserve power. One technique is to place the SoC in a sleep state (low-power state) when certain features of the SoC are not in use (e.g., certain applications are not active).

In the current lowest-power sleep state (deepest sleep state) of an SoC, power to core logic on the SoC is reduced by collapsing a core (CX) power supply rail that provides power to the core logic. In the sleep state, the logic state of the SoC is stored (retained) in internal memory (on-chip memory), which typically includes registers. This allows the SoC to quickly exit from the sleep state without having to reload the logic state into the SoC. Power to the internal memory is provided by a memory (MX) power supply rail that is separate from the CX power supply rail. A drawback of the current lowest-power sleep state is that retention of the logic state of the SoC in the sleep state requires maintaining power to the internal memory, which reduces power savings. Thus, the current lowest-power sleep state still incurs a power penalty at the SoC.

To further reduce power, the SoC may be shut down, and later booted up using a cold boot procedure (flow) when the SoC is needed. The cold boot includes loading images (e.g., boot image, operating system image, etc.) from a non-volatile memory (e.g., flash memory) into a dynamic random access memory (DRAM) memory (e.g., double data rate (DDR) memory) that is external to the SoC. The cold boot also includes one or more authentication procedures to verify that the images have not been altered (e.g., by a malicious program). Sub-systems (e.g., CPU, modem, etc.) on the SoC run the images on the external DRAM memory to place the SoC in a working state, at which point the SoC is ready for use.

Shutting down the SoC reduces power compared with the sleep state by collapsing all of the power rails in the SoC (e.g., CX power supply rail and MX power supply rail). However, this approach requires booting up the SoC in a cold boot up which is time consuming and consumes power. For example, it may take several seconds to load images from the non-volatile memory into the DRAM memory during a cold boot up. This is because the access speed for the non-volatile memory (e.g., flash memory) is relatively slow. The long boot time makes this approach undesirable for many users who desire quick access to the SoC.

Embodiments of the present disclosure provide a new sleep state that is lower power than the current sleep state discussed above while having an exit latency that is shorter than a cold boot, as discussed further below.

Figure 1:
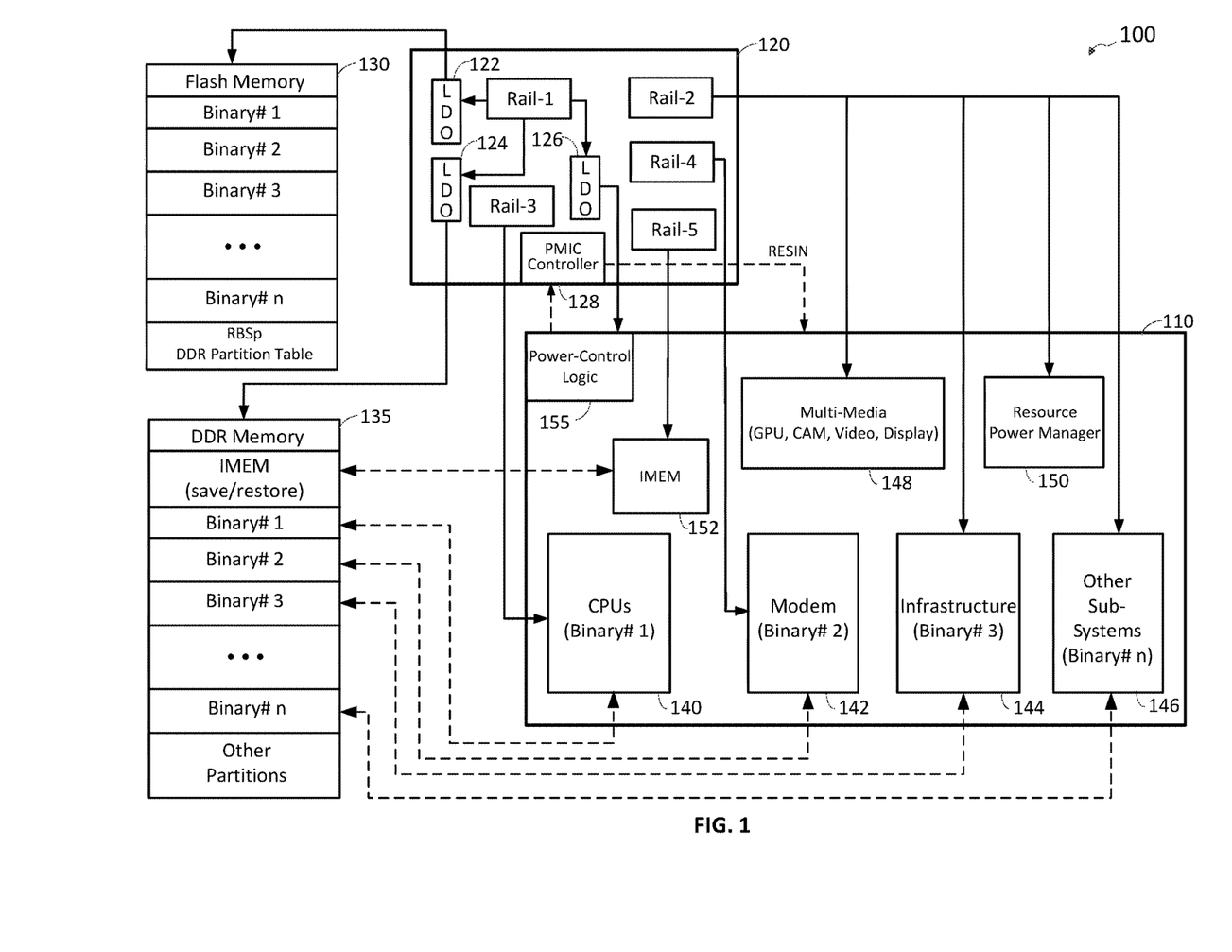
FIG. 1 shows an example of a system for implementing a sleep state according to aspects of the present disclosure.

FIG. 1 shows an example of a system 100 in a mobile device according to certain aspects of the present disclosure. The system 100 includes an SoC 110, a power management integrated circuit (PMIC) 120, a flash memory 130, and a DDR memory 135. In this example, the SoC 110 includes one or more central processing units (CPUs) 140, a modem 142, infrastructure 144, and other sub-systems 146. The SoC 110 also includes multi-media processors 148, a resource power manager 150, and instruction memory (IMEM) 152.

The PMIC 120 is configured to provide power to the SoC 110 via multiple power supply rails. In this regard, the PMIC 120 includes multiple voltage regulators (labeled Rail-1 to Rail-5), in which each voltage regulator converts an input voltage (e.g., from a battery or another power source) into a respective supply voltage, and provides the supply voltage to one or more respective power supply rails. In this example, the PMIC 120 also includes a first low-dropout (LDO) regulator 122, a second LDO regulator 124, and a third LDO regulator 126. Each of the LDO regulators 122, 124 and 126 is configured to regulate the supply voltage from voltage regulator Rail-1 to produce a respective regulated supply voltage, and provide the respective regulated supply voltage to a respective component in the system 100, as shown in FIG. 1. The PMIC 120 also includes a PMIC controller 128 configured to control the voltage regulators Rail-1 to Rail-5, and the LDO regulators 122, 124 and 126, as discussed further below. In FIG. 1, power distribution from the PMIC 120 to the flash memory 130, the DDR memory 135 and the SoC 110 is shown by solid arrows.

The flash memory 130 is configured to store binary images for the SoC 110. In the example in FIG. 1, the images are labeled Binary#1 to Binary# n. Since the flash memory 130 is non-volatile, the flash memory 130 is able to store the images when powered off. The flash memory 130 may be implemented with a NAND flash memory or another type of flash memory.

The DDR memory 135 is configured to store the images and data for the SoC 110, and typically provides much faster access speeds than the flash memory 130. Unlike the flash memory, the DDR memory 135 is volatile and requires power to maintain the contents stored in the DDR memory 135.

When the SoC 110 is first powered on by the PMIC 120, the SoC 110 boots up according to a cold boot procedure (flow). In one example, the SoC 110 may boot up in response to a power reset signal ("RESIN") from the PMIC 120. The cold boot flow may include the following:

Power on power supply rails to SoC 110;
Initialize flash memory 130;
Initialize external DDR memory 135;
Load images from the flash memory 130 into the DDR memory 135;
Authenticate the images; and
Load initial state from images in the DDR memory 135 into the SoC 110 to place SoC 110 in working state.

In one example, a boot loader loads the images from the flash memory 130 into the DDR memory 135 and authenticates the images, as discussed further below. The images may include images for initializing and operating the CPUs 140, the modem 142, the infrastructure 144, and other sub-systems 146.

As discussed above, the boot time of the cold boot is relatively long. The long boot time is due to loading images from the flash memory 130 into the DDR memory 135 (e.g., which may take several seconds) and authenticating the images.

After initial power up, the SoC 110 may later be placed in the new sleep state to conserve power. The new sleep state is referred to as a rock bottom sleep plus (RBSp) state in the present disclosure. However, it is to be understood that the new sleep state is not limited to this term. In certain aspects, the SoC 110 includes power-control logic 155 configured to signal to the PMIC controller 128 to enter the RBSp state and exit the RBSp state, as discussed further below.

In one example, the SoC 110 may be placed in the RBSp state when one or more of the CPUs 140 completes a task and is not scheduled to start the next task for a certain time duration. In this example, one of the CPUs 140 may initiate an RBSp entry flow to place the SoC 110 in the RBSp state. The RBSp entry flow may include setting an RBSp valid value to true and storing the RBSp valid value in the DDR memory 135, the flash memory 130, the power-control logic 155, or the PMIC controller 128. In general, the RBSp valid value can be stored in any non-collapsed or non-volatile memory/entity that can hold the required value(s) in the RBSp state. As discussed further below, the RBSp valid value allows the boot loader to later determine whether the SoC 110 is exiting from the RBSp state. The RBSp entry flow may also include setting a wakeup time value in the power-control logic 155 to indicate when the SoC 110 is to exit the RBSp state. The wakeup time value may be based on a time that one or more of the CPUs 140 are scheduled to start the next task. The RBSp entry flow may also include placing the DDR memory 135 in a self-refresh mode to retain the contents of the DDR memory 135 in the RBSp state.

Figure 2:
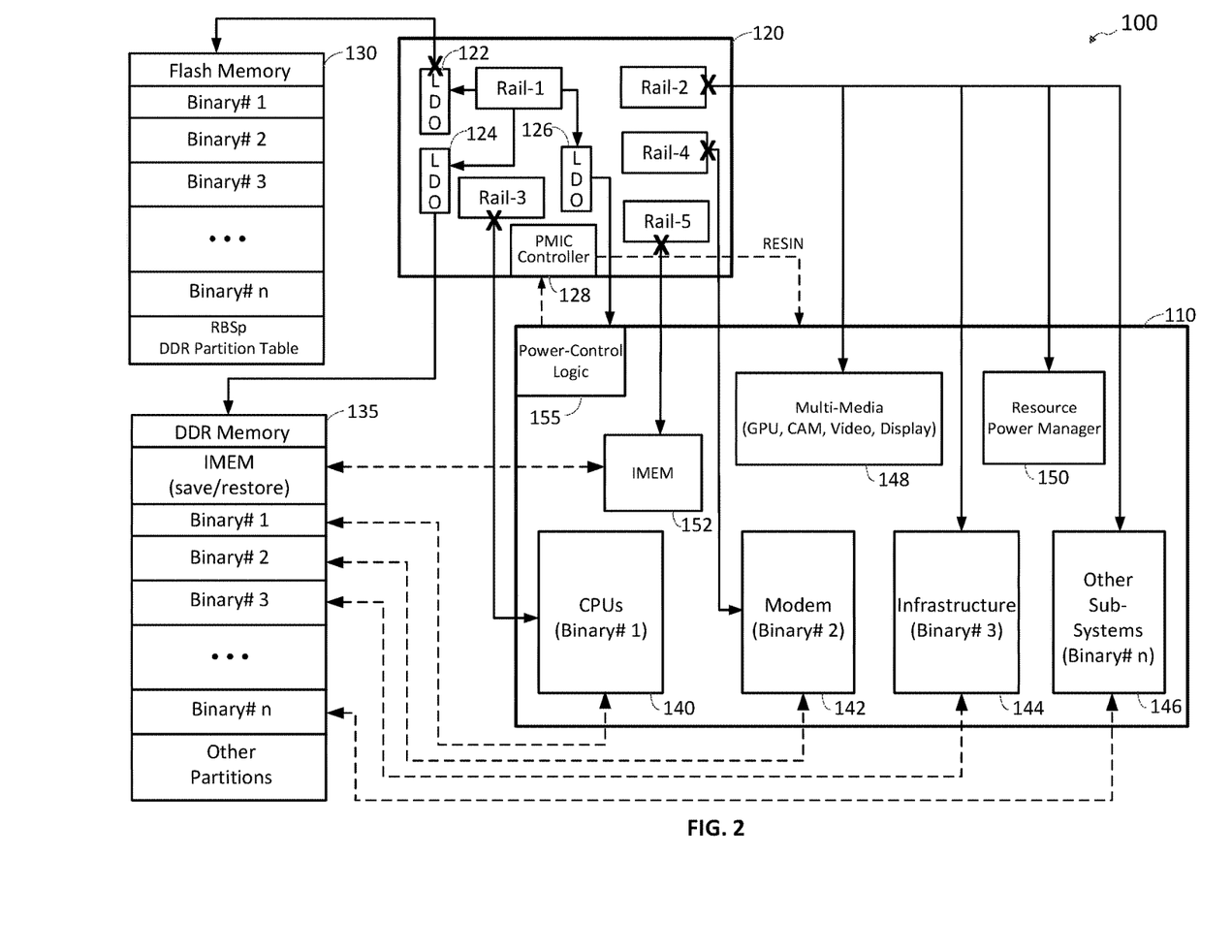
FIG. 2 shows an example of power rails that are collapsed in the sleep state according to aspects of the present disclosure.

The power-control logic 155 may then input a RBSp enter signal to the PMIC controller 128 signaling to the PMIC controller 128 to enter the RBSp state. In response, the PMIC controller 128 shuts down the SoC 110 except for the power-control logic 155 by collapsing power supply rails to the SoC 110 (e.g., the CX and MX power supply rails). If the power-control logic 155 is located off the SoC (e.g., the power-control logic 155 is located on the PMIC 120 or a separate chip), then the SoC may be completely shut off. FIG. 2 indicates the power supply rails that are collapsed in the RBSp state by an "X" next to each power rail that is collapsed. In this example, all of the power supply rails are collapsed except for the power supply rails to the DDR memory 135 and the power-control logic 155. Thus, the PMIC 120 maintains power to the DDR memory 135, allowing the DDR memory 135 to retain its contents in the RBSp state.

The RBSp state provides greater power reduction than the current sleep state discussed above. This is because the RBSp state shuts down the SoC 110 except for the power-control logic 155. If the power-control logic 155 is located off the SoC, then the SoC may be completely shut off. The PMIC 120 maintains power to the DDR memory 135 to retain the images in the DDR memory 135. In contrast, the current sleep state maintains power to internal memory (on-chip memory) of the SoC to retain the logic state of the SoC 110 (e.g., by maintaining power to the MX power supply rails). The RBSp state also reduces power in the PMIC 120 compared with the current sleep state. This is because the PMIC 120 does not maintain power to the internal memory of the SoC 110 in the RBSp state, and can therefore power off circuitry (e.g., voltage regulators) in the PMIC 120 used to power the internal memory of the SoC. Thus, the RBSp state provides much greater power savings than the current sleep state.

In one example, a wakeup timer in the power-control logic 155 tracks the amount of time that the SoC 110 is in the RBSp state. The wakeup timer expires when the amount of time tracked by the time reaches the wakeup time value set in the power-control logic 155. Upon expiration of the wakeup timer, the power-control logic 155 initiates RBSp exit. In this regard, the power-control logic 155 inputs a wakeup signal to the PMIC controller 128 signaling the PMIC controller 128 to exit the RBSp state.

In response, the PMIC controller 128 restores power to the SoC 110 (restores power rails to the SoC 110). The PMIC controller 128 may also input the power reset signal RESIN to the SoC 110, which may initiate the boot up flow.

During boot up, the boot loader reads the RBSp valid value, which indicates the SoC 110 is exiting the RBSp state (i.e., RBSp valid value is true). In response, the boot loader may skip loading the above images (e.g., Binary#1 to Binary# n) from the flash memory 130 into the DDR memory 135, which was performed during the cold boot. This is because the images are already stored in the DDR memory 135 (which remained powered on in the RBSp state), and therefore do not need to be reloaded from the flash memory 130. Thus, the sub-systems (e.g., CPUs, modem, etc.) on the SoC 110 run the images already stored on the DDR memory 135 to restore the SoC 110 to a working state.

The boot loader may also skip the authentication process for the above images since the authentication process was already performed during the initial cold boot of the SoC.

Thus, the RBSp exit flow may skip loading and authenticating the above images, which contribute the most to the latency of a cold boot. As a result, the amount of time needed to exit the RBSp state (referred to as exit latency) is shorter than the latency of the cold boot.

Therefore, the new RBSp state according to certain aspects of the present disclosure provides much better power savings than the current sleep state discussed above while having an exit latency that is shorter than a cold boot.

In FIG. 1, communication between the DDR memory 135 and the sub-systems of the SoC 110 are shown in dashed lines. The sub-systems typically communicate with the DDR memory 135 via a memory controller (shown in FIG. 7), which may be on the SoC 110 or external to the SoC 110. The sub-systems may communicate with one another via buses (not shown in FIG. 1). For example, one of the CPUs 140 may perform some of the RBSp entry operations (e.g., place DDR memory in self-refresh mode) discussed above, and may send a signal to the power-control logic 155 indicating when the system is ready to enter the RBSp state. In response, the power-control logic 155 may input the RBSp enter signal to the PMIC 120, as discussed above.

Figure 3:
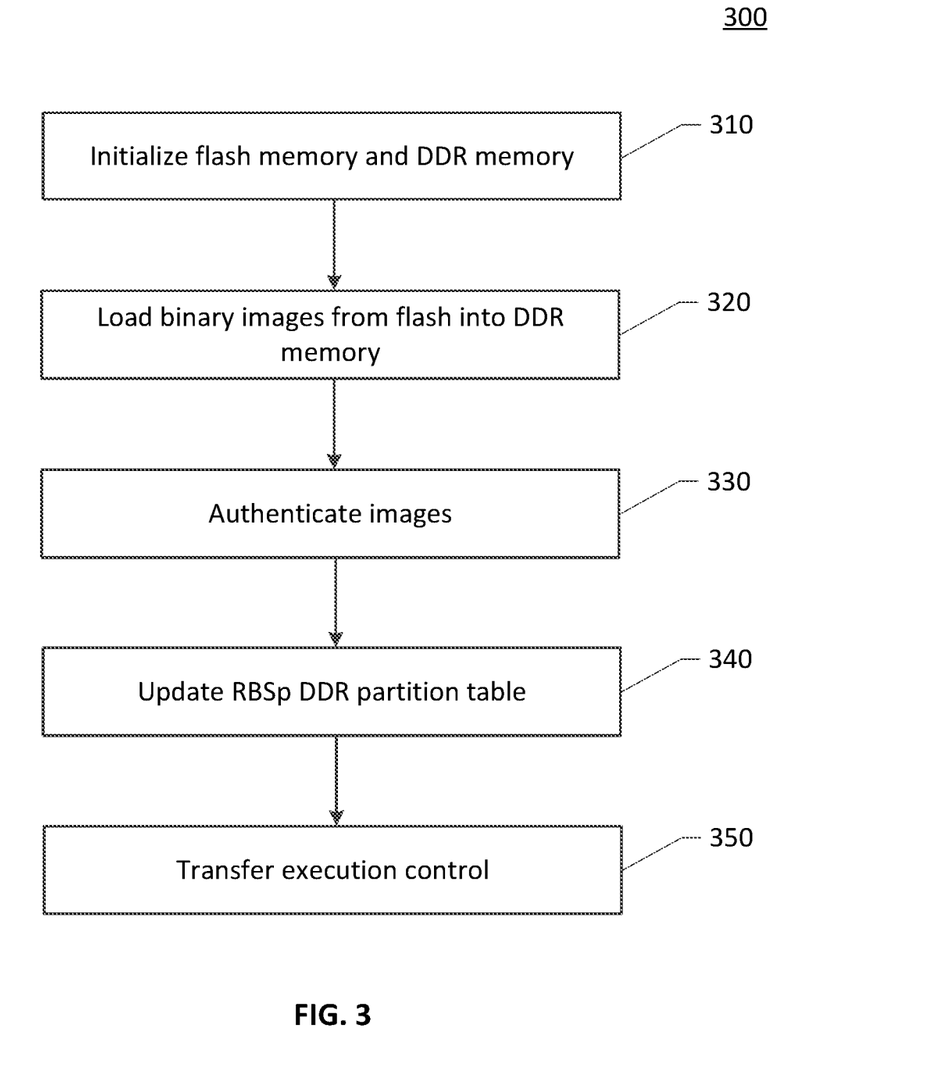
FIG. 3 is a flowchart illustrating an example of a cold boot flow according to aspects of the present disclosure.

FIG. 3 is a flowchart illustrating an example of a cold boot flow 300 according to aspects of the present disclosure. In the present disclosure, the term "flow" may refer to a procedure or method. The cold boot flow 300 may be initiated when the system 100 is first powered on.

At step 310, the flash memory 130 and DDR memory 135 are initialized.

At step 320, binary images (e.g., Binary#1 to Binary# n) are loaded from the flash memory 130 into the DDR memory 135. In one example, the image loading is performed by a secondary boot loader. In this example, a primary boot loader is executed from read-only memory (ROM) at the start of boot up. The primary boot loader loads the secondary boot loader from the flash memory 130 into the DDR memory or another memory, and authenticates the secondary boot loader. The primary boot loader authenticates the second boot loader to verify that the secondary boot loader has not been altered (e.g., by a malicious program). If the primary boot loader successfully authenticates the secondary boot loader, then the primary boot loader passes control of the boot process to the second boot loader. The secondary boot loader may be executed at a boot processor. If the primary boot loader fails to authenticate the secondary boot loader, then the boot may be aborted.

At step 330, the images are authenticated. For example, each image may be signed with a respective digital signature, in which the digital signature was generated using a cryptographic algorithm based on the entire image or a portion of the image, and a private key of a private-public key pair. In this example, the secondary boot loader may authenticate an image by verifying the respective digital signature using the public key of the respective private-public key pair. This allows the secondary boot loader to verify that the image read from the flash memory 130 matches the image that was used to generate the digital signature, and therefore verify that the read image has not been altered. If the secondary boot loader is unable to verify a digital signature, then the secondary boot loader may abort the boot.

In another example, each image may be accompanied by a respective checksum, in which the checksum was computed using a checksum algorithm based on the entire image or a portion of the image. In this example, the secondary boot loader authenticates an image by computing a checksum on the entire image or a portion of the image read from the flash memory 130, and the comparing the computed checksum with the checksum accompanying the image. If there is a match, then the secondary boot loader successfully authenticates the image. If there is no match, then the secondary boot loader may abort the boot.

It is to be appreciated that the present disclosure is not limited to the exemplary authentication techniques discussed above, and that other authentication techniques may be used instead of or in addition to the exemplary authentication techniques discussed above.

At step 340, a RBSp DDR partition table is updated. For example, the secondary boot loader may update the RBSp DDR partition table. The RBSp DDR partition table may indicate the location (e.g., start address) and size of each image loaded into the DDR memory 135.

At step 350, the secondary boot loader may transfer control, for example, to an operating system running on one or more of the CPUs 140 and/or another processor.

It is to be understood that the cold boot flow 300 is not limited to the specific order disclosed above. For example, the cold boot flow 300 does not require that all of the images be loaded in step 320 before the start of authentication in step 330. For instance, a binary image may be authenticated before another one of the binary images is loaded. Accordingly, steps 320 and 330 may overlap. Also, it is to be appreciated that the cold boot flow 300 may include additional steps.

Figure 4:
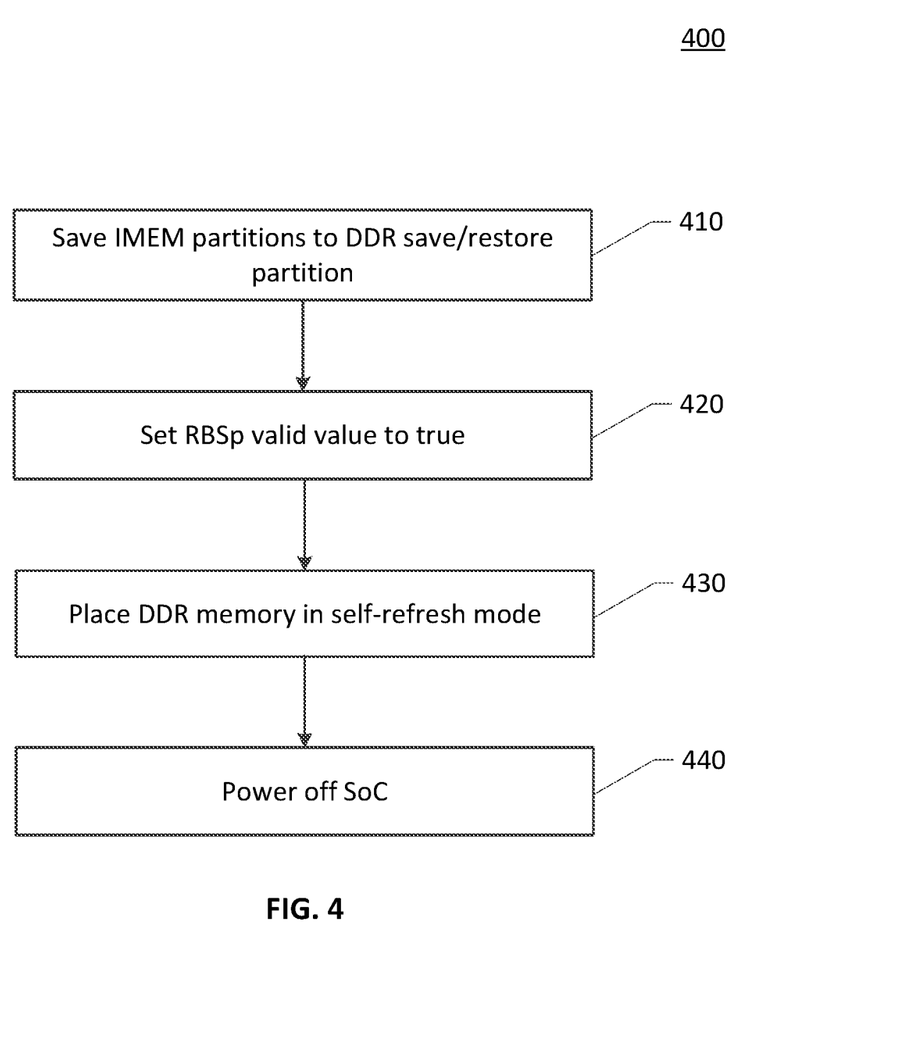
FIG. 4 is a flowchart illustrating an example of a procedure for entering the sleep state according aspects of the present disclosure.

FIG. 4 is a flowchart illustrating an example of a RBSp entry flow 400 for entering the RBSp state according aspects of the present disclosure.

At step 410, instructions in the IMEM 152 are transferred (written) to an IMEM partition in the DDR memory 135. The instructions may include instructions that are executed by one or more sub-systems (e.g. CPU) on the SoC 110. The IMEM 152 may be used, for example, to provide the sub-systems with fast access to the instructions. Storing the instructions in the DDR memory 135 allows the instructions to be restored to the IMEM 152 when the SoC exits the RBSp state.

At step 420, the RBSp valid value is set to true. The RBSp valid value allows the secondary boot loader to later determine whether the SoC 110 is exiting from the RBSp state, as discussed further below. The RBSp valid value may be stored in the flash memory 130 and/or the DDR memory 135.

At step 430, the DDR memory 135 is placed in the self-refresh mode. In the self-refresh mode, the DDR memory 135 automatically executes refresh operations using a refresh counter.

At step 440, the SoC 110 is powered off. For example, the power-control logic 155 may input the RBSp enter signal to the PMIC controller 128 signaling to the PMIC controller 128 to enter the RBSp state. In response, the PMIC controller 128 may shut down the SoC 110 except for the power-control logic 155 by collapsing power supply rails to the SoC 110 (e.g., the CX and MX power supply rails). If the power-control logic 155 is located off chip, then the entire SoC may be shut off. In one example, the PMIC controller 128 may power collapse the power rails indicated in FIG. 2.

It is to be understood that the RBSp entry flow 400 is not limited to the specific order of steps disclosed above. Also, it is to be appreciated that the RBSp entry flow 400 may include additional steps. For example, the RBSp entry flow may also include setting the wakeup time value discussed above, which specifies when the system is to exit the RB Sp state.

Figure 5:
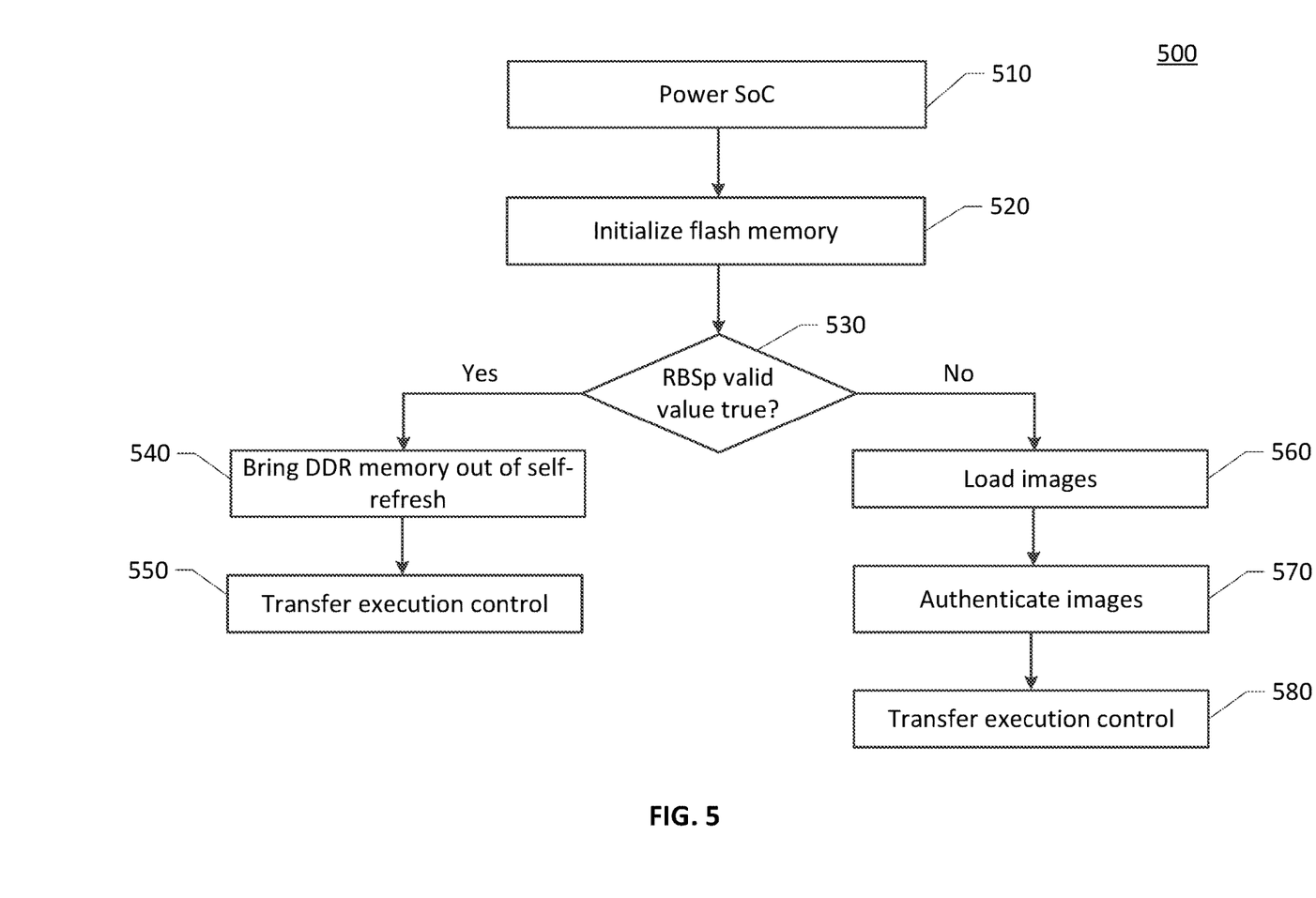
FIG. 5 is a flowchart illustrating an example of a procedure for exiting the sleep state according to aspects of the present disclosure.

FIG. 5 is a flowchart illustrating an example of a flow 500 for exiting the RBSp state according to aspects of the present disclosure. The RBSp exit flow may be triggered by a wakeup event (e.g., a wakeup signal from the power-control logic 155, as discussed above).

At step 510, the SoC 110 is powered up. For example, the PMIC controller 128 may turn on the power supply rails that were collapsed in the RBSp state. The PMIC 120 turns on these rails without disturbing the rails that were kept on in the RBSp state. The PMIC controller 128 may also input a power reset signal RESIN to the SoC. In response, SoC may start boot up by executing the primary boot loader from ROM. The primary boot loader may then load and authenticate the secondary boot loader, as discussed above. The primary boot load may authenticate the secondary boot loader using any of the authentication techniques discussed above, or another authentication technique.

At step 520, the flash memory 130 is initialized.

At step 530, a determination is made whether the RBSp valid value is true. For example, the secondary boot loader may read the RBSp valid value (e.g., from the flash memory) to determine whether the RBSp valid value is true. If the RBSp valid value is true (which indicates that the system 100 is exiting the RBSp state), then the flow proceeds to step 540.

At step 540, the DDR memory 135 is taken out of the self-refresh mode. This allows sub-systems (e.g., CPUs, modem, etc.) to access the DDR memory 135 to run the images on the DDR memory 135, and restore the system to a working state.

At step 550, the secondary boot loader may transfer control, for example, to an operating system running on one or more of the CPUs 140 and/or another processor.

When the RBSp valid value is true (i.e., the system 100 is exiting the RBSp state), the secondary boot loader may skip loading and authenticating the binary images (e.g., Binary#1 to Binary# n), as discussed above.

If the RBSp valid value is false, then the flow 500 proceeds to step 560. In this case, the flow 500 may perform a cold boot.

At step 560, the binary images (e.g., Binary#1 to Binary# n) are loaded from the flash memory 130 into the DDR memory 135. The secondary boot loader may load the images, as discussed above.

At step 570, the images are authenticated. For example, the secondary boot loader may authenticate the images by verifying digital signatures and/or checksums attached to the images, as discussed above.

At step 580, the secondary boot loader may transfer control, for example, to an operating system running on one or more of the CPUs 140 and/or another processor.

As demonstrated above, the exemplary flow 500 in FIG. 5 is not limited to exiting the RBSp state, and may also be used during initial power up of the system to performed a cold boot. When the system 100 is initially powering up (i.e., not exiting an RBSp state), the RBSp valid value is false. In this case, the flow 500 proceeds to step 560 and performs the cold boot operations (i.e., loading and authenticating the binary images).

It is to be understood that the flow 500 is not limited to the specific order disclosed above. Also, it is to be understood that the flow 500 may include additional steps. For example, the flow 500 may include updating the RBSp DDR partition table discussed above when the RBSp valid value is false. In another example, the flow 500 may include transferring the instructions in the IMEM partition of the DDR memory 135 back to the IMEM 152 when the RBSp valid value is true to restore the instructions in the IMEM 152.

Each of the images (e.g., Binary#1 to Binary# n) may include a read only (RO) portion and a read-write (RW) portion. The RO portion of the image may include program code and constant values. The RW portion may include data including values of variables, which may be changed during runtime. The RO portion is typically much larger than the RW portion (e.g., at least five times larger).

In some embodiments, when exiting the RBSp state, the secondary boot loader skips reloading both the RO and RW portions of the binary images from the flash memory 130.

In other embodiments, when exiting the RBSp state, the secondary boot loader skips reloading the RO portion of the binary images from the flash memory 130, but reloads the RW portion of the binary images from the flash memory 130 into the DDR memory 135. Although the RW portion of the images is reloaded from the flash memory 130 in these embodiments, the exit latency for the RBSp state is still shorter than the boot time of a cold boot. This is because the RW portion of the images typical makes up a small portion of the total size of the images. For the exemplary flow 500 shown in FIG. 5, the RW portion of the images may be reloaded from the flash memory 130 into the DDR memory 135 when the RBSp valid value is true.

In still other embodiments, the RW portion of the images may be compressed using a compression algorithm to produce a compressed copy of the RW portion of the images. For example, the compressed copy of the RW portion may be in a zip format. The compressed copy of the RW portion may be stored in the DDR memory 135. During RBSp exit, the compressed copy of the RW portion in the DDR memory 135 is uncompressed (unzipped) instead of reloading the RW portion of the images from the flash memory 130.

Figure 6:
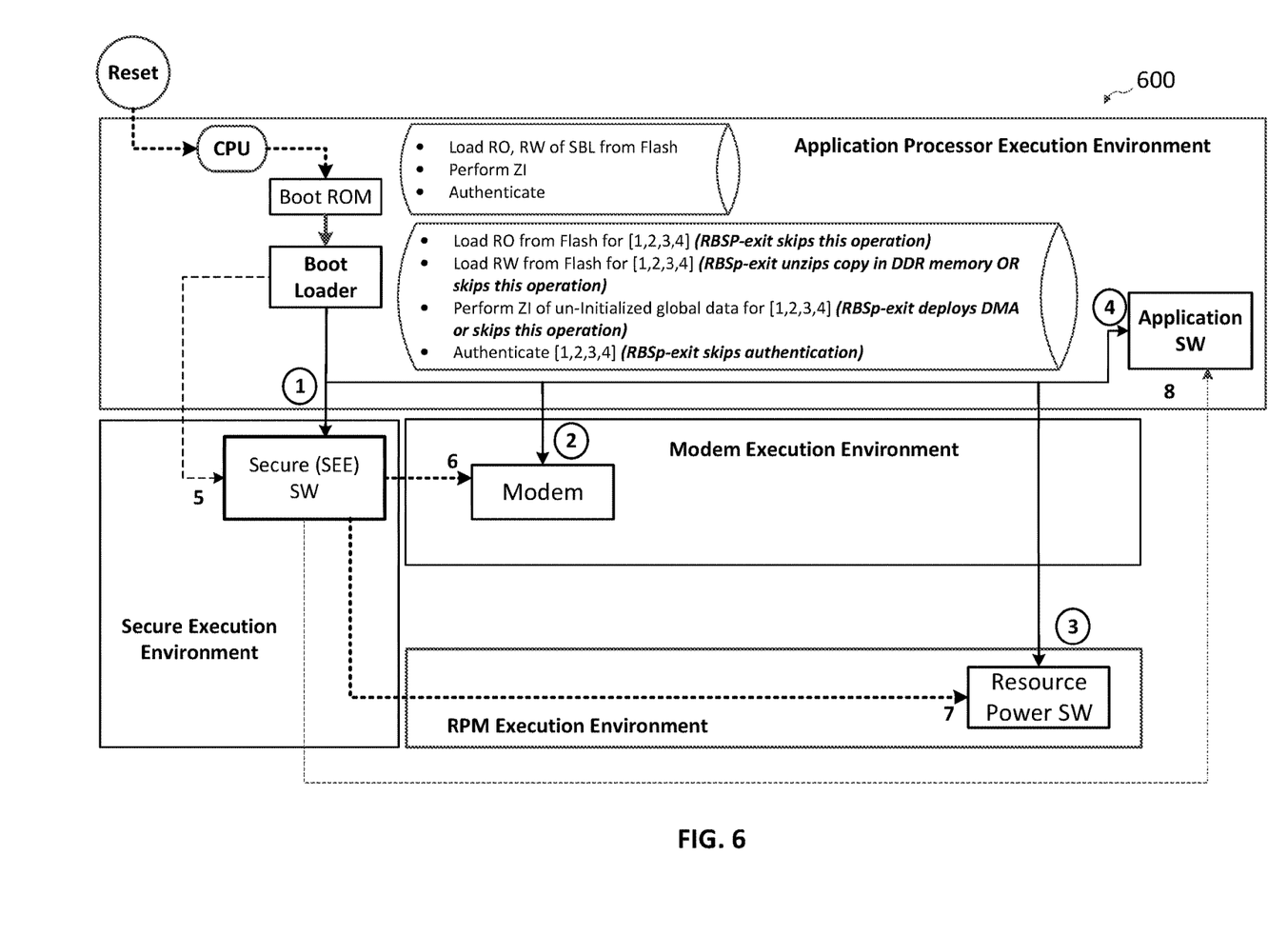
FIG. 6 illustrates a flow for performing a cold boot or exiting the sleep state according to certain aspects of the present disclosure.

FIG. 6 illustrates a flow 600 for performing a cold boot or exiting the RBSp state (e.g., depending on whether the RBSp valid value is true) according to certain aspects of the present disclosure. The flow 600 is described first below for the case of a cold boot.

In this example, the flow 600 may be initiated by a power reset ("Reset" in FIG. 6). At the start of boot up, the primary boot loader is executed from ROM. In FIG. 6, the primary boot loader is referred to "Boot ROM". The primary boot loader loads the secondary boot loader from the flash memory 130 into the DDR memory or another memory. The primary boot loader may also perform zero initialization ("ZI"), in which certain variables of the secondary boot loader are initialized to zero. The primary boot loader also authenticates the second boot loader to verify that the secondary boot loader has not been altered (e.g., by a malicious program). The primary boot loader may authenticate the secondary boot loader using any of the techniques discussed above.

The secondary boot loader ("Boot Loader") then loads the binary images, including the RO and RW portions of the images, from the flash memory 130 into the DDR memory 135. The secondary boot loader may also perform zero initialization ("ZI"), in which certain variables of the images are initialized to zero. The secondary boot loader also authenticates the images to verify that the images have not been altered (e.g., by a malicious program). The secondary boot loader may authenticate the images using any of the techniques discussed above. In FIG. 6, the box next to the "Boot Loader" lists operations performed for a cold boot. Operations that may be skipped during an RBSp exit are shown in parenthesis.

In the example in FIG. 6, the images include: (1) secure execution environment (SEE) software, (2) modem software, (3) resource power software, and (4) application software. The solid arrows in FIG. 6 pointing to these images represent the loading of these images into the DDR memory 135 by the secondary boot loader.

The secondary boot loader may then initiate execution of the SEE software (5) on one or more of the CPUs 140 and/or another processor. When executed, the SEE software creates a secure execution environment that is protected from attack by a malicious program running in another execution environment (e.g., running on a high-level operating system). The SEE software may include a secure operating system and/or one or more trusted applications responsible for setting access controls (e.g., to system resources and sensitive data), providing services to other execution environments, and/or bringing other execution environments to life.

In the example in FIG. 6, the SEE software initiates the modem execution environment (6) to get the modem 142 operational. The modem 142 is configured to connect the system 100 to a wireless network (e.g., cellular network, a WiFi network, etc.), and includes one or more digital signal processors (DSPs) and one or more transceivers.

In the example in FIG. 6, the SEE software also initiates execution of the resource power software (7) to get the resource power manager 150 operational. The resource power manager 150 is configured to manage power for the SoC 110. For example, the resource power manager 150 may perform dynamic clock voltage scaling (DCVS), in which the supply voltages and/or clock frequencies in the SoC are dynamically scaled (e.g., based on performance requirements of sub-systems on the SoC).

In the example in FIG. 6, the SEE software also initiates execution of application software (8). For example, the application software may include feature-rich applications with a high-level operating system (e.g., Linux, Windows, TreadX, etc.).

The flow 600 will now be described for the case of an RBSp exit. In this example, the flow 600 may be initiated by a power reset ("Reset"). The primary boot loader ("Boot ROM") loads the secondary boot loader from the flash memory 130 into the DDR memory or another memory. The primary boot loader may also perform zero initialization ("ZI"), in which certain variables of the secondary boot loader are initialized to zero. The primary boot loader also authenticates the second boot loader to verify that the secondary boot loader has not been altered (e.g., by a malicious program). If the primary boot loader successfully authenticates the second boot loader, the primary boot loader passes control to the secondary boot loader.

For RBSp exit, the secondary boot loader ("Boot Loader") may skip one or more of the operations that were performed for the cold boot discussed above. As discussed above, the secondary boot loader may recognize that the system is exiting the RBSp when the RBSp valid value is true.

The secondary boot loader may skip loading the RO portion (program code and constants) of the images from the flash memory 130 into the DDR memory 135.

In one example, the secondary boot loader may also may skip loading the RW portion of the images from the flash memory 130 into the DDR memory 135. In another example, the secondary boot loader may uncompress (e.g., unzip) a compressed copy of the RW portion of the images in the DDR memory 135. In still another example, the secondary boot loader may reload the RW portion of the images from the flash memory 130 into the DDR memory 135.

In one example, the secondary boot loader may perform zero initialization ("ZI"), in which certain variables of the images are initialized to zero. The secondary boot loader may perform zero initialization using direct memory access to speed the process. In another example, the secondary boot loader skips zero initialization.

Finally, the secondary boot loader may skip authenticating the images.

The secondary boot loader may then initiate execution of the SEE software (5) on one or more of the CPUs 140 and/or another processor. As discussed above, the SEE software initiates the modem execution environment (6) to get the modem 142 operational. The SEE software also initiates execution of the resource power software (7) and the application software (8), as discussed above.

It is to be understood that the flow 600 is not limited to the specific order disclosed above. Also, it is to be understood that the flow 600 may include additional steps.

Figure 7:
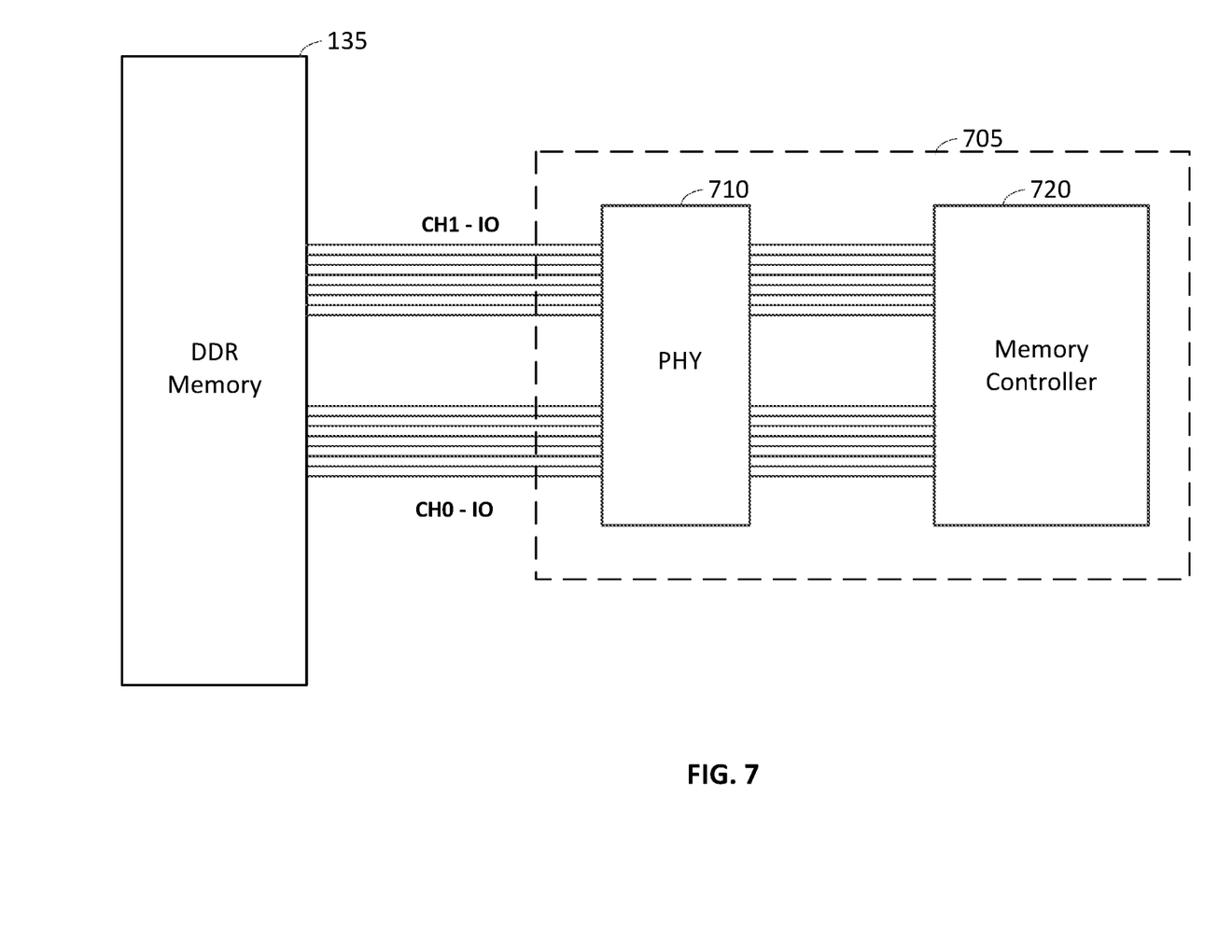
FIG. 7 shows an example of a memory interface for interfacing with a double data rate (DDR) memory according to certain aspects of the present disclosure.

FIG. 7 shows an example of a memory interface 705 for transferring images and data between sub-systems on the SoC 110 and the DDR memory 135. The memory interface 705 includes a memory controller 720 and a PHY block 710. In one example, the memory controller 720 is integrated on the SoC 110. In this example, the memory controller 720 may be referred to as an integrated memory controller (IMC), a bus-integrated memory controller (BIMC), or another terminology. The memory controller 720 is responsible for buffering and serving memory requests from sub-systems on the SoC that need to access images and/or data in the DDR memory 135.

The memory controller 720 communicates with the DDR memory 135 via a physical (PHY) block 710. The PHY block 710 may be coupled to the DDR memory 135 via one or more channels. The PHY block 710 may include one or more transceivers (not shown) for transmitting signals to and receiving signals from the DDR memory 135 over the one or more channels. In the example in FIG. 7, the PHY block 710 is coupled to the DDR 135 via channels CH0 and CH1 in which each channel may include multiple lines for transferring multiple bits across the channel in parallel.

When the system 100 enters the RBSp state, the PHY block 710 may be placed in a freeze input/output (I/O) state to stop access to the contents of the DDR memory 135. The DDR memory 135 may also be placed in the self-refresh mode to retain the contents of the DDR memory 135 in the RBSp state, as discussed above. The PHY block 710 is unfrozen when exits the RBSp state.

Figure 8:
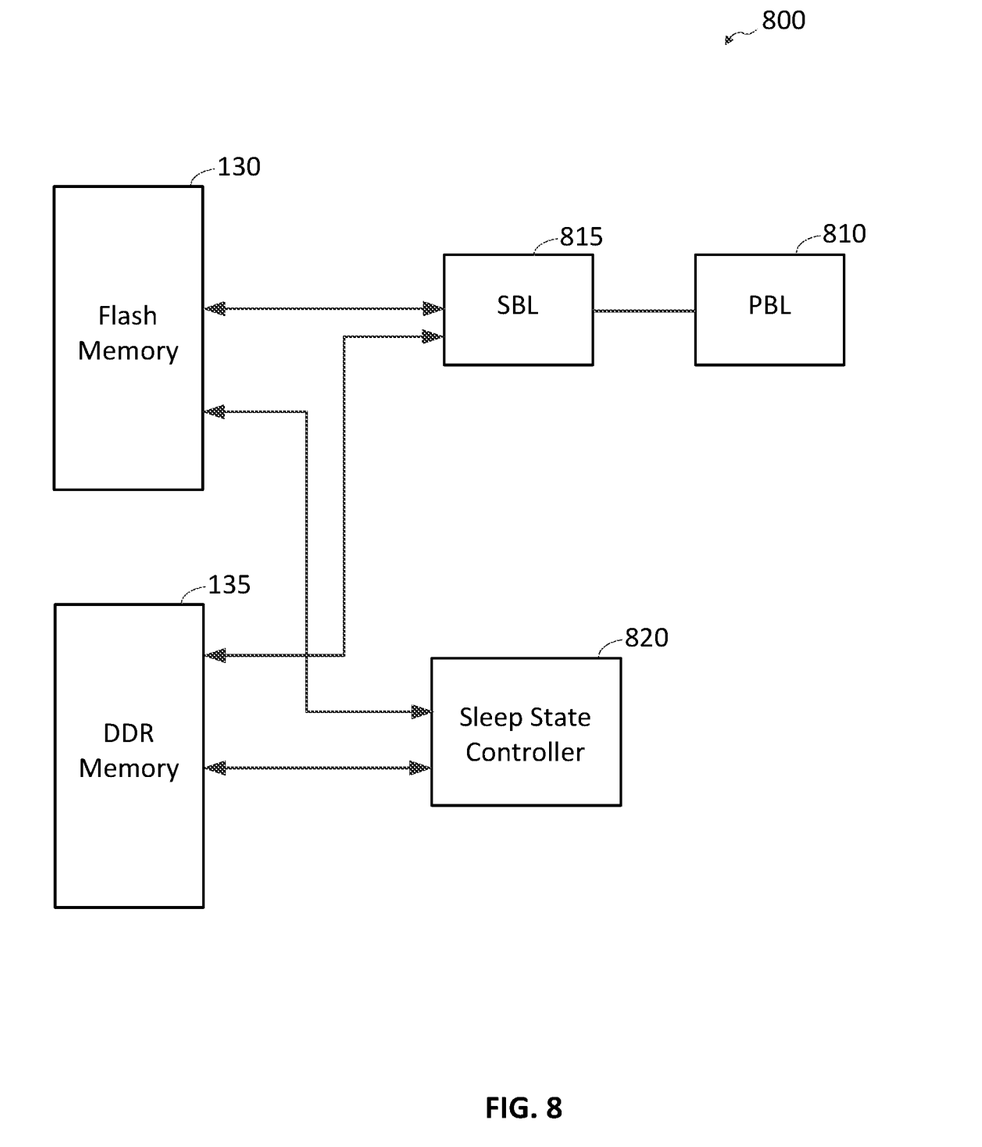
FIG. 8 shows a block diagram of a system for entering and exiting the sleep state according to aspects of the present disclosure.

FIG. 8 shows a block diagram of a system 800 for entering and exiting the RBSp state according to certain aspects. The system 800 includes the flash memory 130, the DDR memory 135, the primary boot loader (PBL) 810, the secondary boot loader (SBL) 815, and a sleep state controller 820.

The primary boot loader 810 performs the operations of the primary boot loader discussed above including loading and authenticating the secondary boot loader 815, and may be implemented by a boot processor executing a boot image (e.g., boot code) from ROM. As discussed above, the primary boot loader 810 may be activated by power reset RESIN from the PMIC 120. The secondary boot loader 815 performs the operations of the secondary boot loader discussed above including loading and authenticating the images (e.g., Binary#1 to Binary#2) in a cold boot, and may be implemented by a boot processor executing a boot image (e.g., from flash memory 130). In one example, one or more of the CPUs 140 may function as the boot processor.

The sleep state controller 820 is configured to perform one or more of the operations for entering the RBSp state discussed above. For example, the sleep state controller 820 may perform the RBSp entry flow 400 discussed above. The sleep state controller 820 may be implemented by one or more of the CPUs 140 and the power-control logic 155. In this example, the one or more CPUs 140 may execute code for performing the operations discussed above.

As shown in FIG. 8, the secondary boot loader 815 and the sleep state controller 820 access the flash memory 130 and the DDR memory 135. Access to the flash memory 130 may be provided by a flash memory interface (not shown), which may be integrated on the SoC 110. Access to the DDR memory 135 may be provided by the DDR memory interface 705 shown in FIG. 7 and discussed above.

Figure 9:
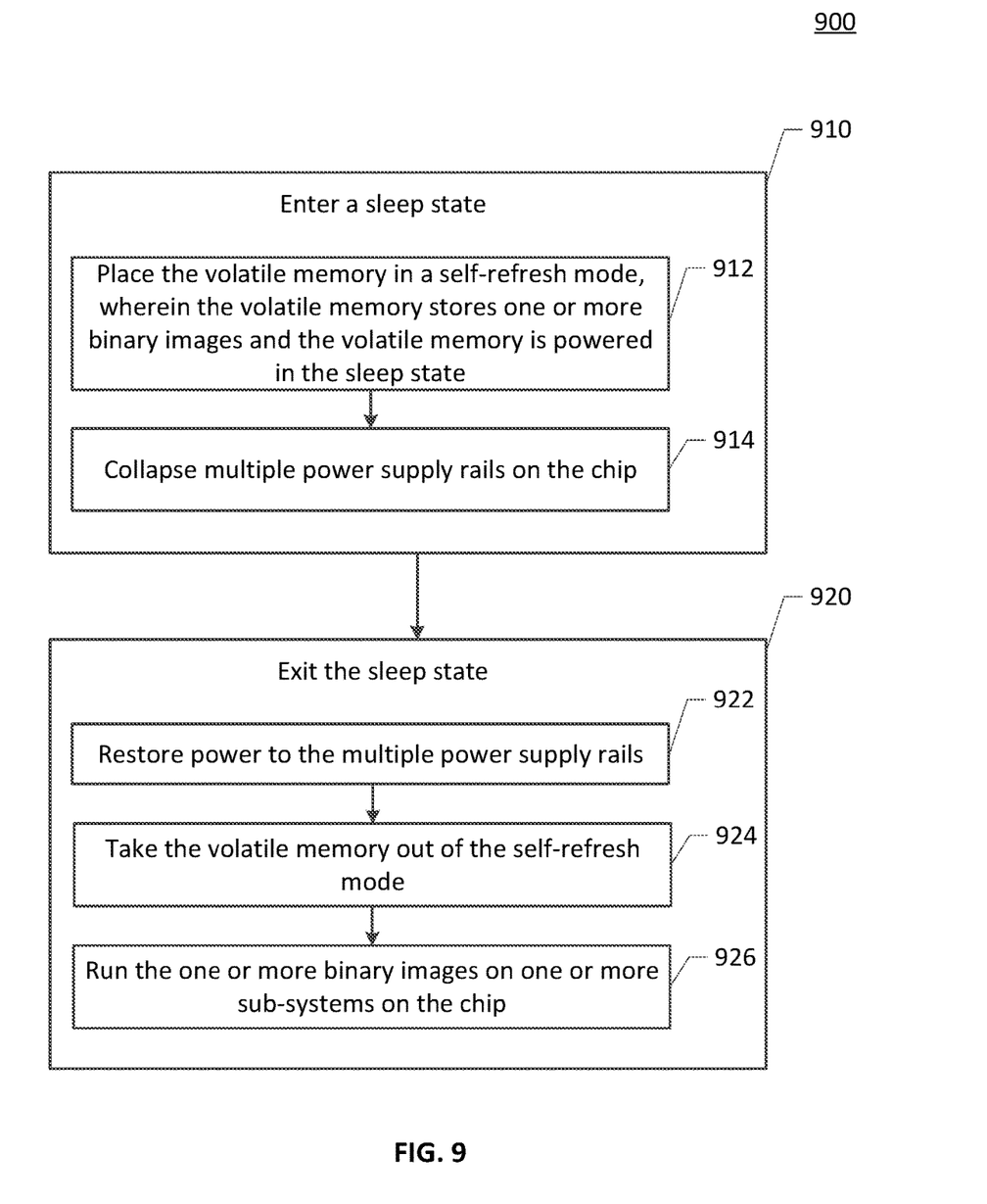
FIG. 9 is a flowchart illustrating an exemplary method for reducing power in a system according to certain aspects of the present disclosure.

FIG. 9 is a flowchart illustrating a method 900 for reducing power in a system. The system (e.g., system 100) includes a chip (e.g., SoC 110), and a volatile memory (e.g., DDR memory 135).

At step 910, the system enters a sleep state. Entering the sleep state includes, at sub-step 912, placing the volatile memory in a self-refresh mode, wherein the volatile memory stores one or more binary images and the volatile memory is powered in the sleep state. This may be done so that the volatile memory (e.g., DDR memory 135) retains the one or more binary images in the sleep state (e.g., RBSp state). Entering the sleep state also includes, at sub-step 914, collapsing multiple power supply rails on the chip. The multiple power supply rails may include both CX power supply rails and MX power supply rails. Collapsing the multiple power supply rails may be accomplished by shutting off power to the multiple power supply rails.

At step 920, the system exits the sleep state. Exiting the sleep state includes, at sub-step 922, restoring power to the multiple power supply rails on the chip. Exiting the sleep state also includes, at sub-step 924, taking the volatile memory out of the self-refresh mode. Exiting the sleep state further includes, at sub-step 926, running the one or more binary images on one or more sub-systems on the chip. For example, the one or more binary images may include at least one of an operating system image, a modem image, a power resource image, or a software application image, and the one or more sub-systems may include at least one of a central processing unit, a modem, or a resource power manager. In certain aspects, the system exits the sleep state (e.g., RBSp state) without reloading the one or more images from a non-volatile memory (e.g., flash memory 130) into the volatile memory or reauthenticating the one or more images, both of which may be performed in a cold boot.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two components. The term "sub-system" is used broadly, and intended to cover hardware implementations of electrical devices and conductors that, when connected and configured, enable the performance of the functions described in the present disclosure. The term "sub-system" is also intended to cover software implementations, in which a processor performs the functions described herein by executing software comprising code for performing the functions. The software may be stored on a computer-readable storage medium, such as the DDR memory 135, on-chip memory, and/or another type of memory.

It is to be understood that present disclosure is not limited to the specific order or hierarchy of steps in the methods disclosed herein. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method for reducing power in a system, the system including a chip, and a volatile memory, the method comprising:
   performing a cold boot, wherein performing the cold boot comprises:
      loading one or more binary images from a non-volatile memory into the volatile memory; and
      authenticating the one or more binary images;
   entering a sleep state, wherein entering the sleep state comprises:
      placing the volatile memory in a self-refresh mode, wherein the volatile memory stores the one or more binary images in the self-refresh mode, the one or more binary images include variables, and the volatile memory is powered in the sleep state; and
      collapsing multiple power supply rails on the chip; and
   exiting the sleep state, wherein exiting the sleep state comprises:
      restoring power to the multiple power supply rails on the chip;
      taking the volatile memory out of the self-refresh mode;
      initializing the variables; and
      running the one or more binary images on one or more sub-systems on the chip,
   wherein the one or more binary images are not reauthenticated when the system exits the sleep state.

2. The method of claim 1, wherein the one or more images includes at least one of an operating system image, a modem image, a power resource image, or a software application image.

3. The method of claim 2, wherein the one or more sub-systems includes a central processing unit, a modem, or a resource power manager.

4. The method of claim 1, wherein the multiple power supply rails include a core power supply rail for powering core logic on the chip, and a memory power supply rail for powering internal memory on the chip.

5. The method of claim 1, wherein the one or more binary images are not reloaded from the non-volatile memory into the volatile memory when the system exits the sleep state.

6. The method of claim 1, wherein the one or more binary images include a read-only (RO) portion and a read-writable (RW) portion, a compressed copy of the RW portion of the one or more binary images is stored on the volatile memory, and exiting the sleep state further comprises uncompressing the compressed copy of the RW portion of the one or more binary images.

7. The method of claim 1, wherein the one or more binary images include a read-only (RO) portion and a read-writable (RW) portion, and exiting the sleep state further comprises reloading the RW portion of the one or more binary images from the non-volatile memory into the volatile memory, wherein the RO portion of the one or more binary images is not reloaded from the non-volatile memory into the volatile memory when the system exits the sleep state.

8. The method of claim 1, wherein entering the sleep state comprises transferring instructions from an internal memory on the chip to the volatile memory, and exiting the sleep state comprises transferring the instructions from the volatile memory to the internal memory on the chip.

9. The method of claim 1, wherein exiting the sleep state is performed upon expiration of a wakeup timer.

10. A system, comprising:
    a volatile memory;
    a power controller configured to control power to multiple power rails;
    a boot loader configured to perform a cold boot by loading one or more binary images from a non-volatile memory into the volatile memory, and authenticating the one or more binary images; and
    a sleep state controller configured to place the system in a sleep state by placing the volatile memory in a self-refresh mode, wherein the volatile memory stores the one or more binary images in the self-refresh mode and the one or more binary images include variables, and outputting a sleep-state enter signal to the power controller, wherein the power controller is further configured to collapse the multiple power supply rails in response to the sleep-state enter signal, to power the volatile memory in the sleep state, and to restore power to the multiple power supply rails in response to a wakeup event;
    wherein the boot loader is further configured to take the system out of the sleep state by taking the volatile memory out of the self-refresh mode when the power to the multiple power supply rails is restored, initializing the variables, and causing one or more sub-systems to run the one or more binary images on the volatile memory; and
    wherein the boot loader is configured to skip authenticating the one or more binary images when the system exits the sleep state.

11. The system of claim 10, wherein the one or more images includes at least one of an operating system image, a modem image, a power resource image, or a software application image.

12. The system of claim 11, wherein the one or more sub-systems includes a central processing unit, a modem, or a resource power manager.

13. The system of claim 10, wherein the multiple power supply rails include a core power supply rail for powering core logic on a chip, and a memory power supply rail for powering internal memory on the chip.

14. The system of claim 10, wherein the boot loader is configured to skip reloading the one or more binary images from the non-volatile memory into the volatile memory when the system exits the sleep state.

15. The system of claim 14, wherein the one or more binary images include a read-only (RO) portion and a read-writable (RW) portion, a compressed copy of the RW portion of the one or more binary images is stored on the volatile memory, and the boot loader is configured to uncompress the compressed copy of the RW portion of the one or more binary images when the system exits the sleep state.

16. The system of claim 10, wherein the one or more binary images include a read-only (RO) portion and a read-writable (RW) portion, and wherein the boot loader is further configured to reload the RW portion of the one or more binary images from the non-volatile memory into the volatile memory when the system exits the sleep state, and skip reloading the RO portion of the one or more binary images from the non-volatile memory into the volatile memory when the system exits the sleep state.

17. The method of claim 1, wherein initializing the variables comprises initializing the variables to zero.

18. The method of claim 1, wherein performing the cold boot further comprises initializing the variables.

19. The system of claim 10, wherein the boot loader is configured to initialize the variables to zero.

20. The system of claim 10, wherein performing the cold boot further comprises initializing the variables.

* * * * *